United States Patent
Henty

(10) Patent No.: US 7,123,242 B1
(45) Date of Patent: Oct. 17, 2006

(54) REMOTE CONTROL METHOD USING REMOTE CONTROL DEVICE WITH KEYBOARD

(76) Inventor: David L. Henty, 19900 MacArthur Blvd., Suite 1150, Irvine, CA (US) 92612

( * ) Notice: Subject to any disclaimer, the term of this patent is extended or adjusted under 35 U.S.C. 154(b) by 162 days.

(21) Appl. No.: 10/333,995

(22) PCT Filed: Jul. 24, 2000

(86) PCT No.: PCT/US00/40468

§ 371 (c)(1),
(2), (4) Date: Jan. 24, 2003

(87) PCT Pub. No.: WO02/09283

PCT Pub. Date: Jan. 31, 2002

Related U.S. Application Data

(63) Continuation-in-part of application No. 09/065,709, filed on Apr. 24, 1998, now Pat. No. 6,094,156.

(51) Int. Cl.
  *G09G 5/00* (2006.01)
  *G08B 5/00* (2006.01)
  *H03K 11/00* (2006.01)
  *H04L 17/02* (2006.01)
(52) U.S. Cl. ............... 345/169; 340/815.6; 341/20; 341/22; 341/176; 345/172
(58) Field of Classification Search ............ 345/169
  See application file for complete search history.

(56) References Cited

U.S. PATENT DOCUMENTS

| | | | | |
|---|---|---|---|---|
| 5,410,333 A | * | 4/1995 | Conway | 345/169 |
| 5,436,625 A | * | 7/1995 | Kubo | 341/22 |
| 5,457,453 A | * | 10/1995 | Chiu et al. | 341/22 |
| 5,464,292 A | * | 11/1995 | Grant | 400/715 |
| 5,486,986 A | * | 1/1996 | Brada | 362/85 |
| 5,502,460 A | * | 3/1996 | Bowen | 345/168 |
| 5,653,543 A | * | 8/1997 | Abe | 400/489 |
| 5,831,555 A | * | 11/1998 | Yu et al. | 341/26 |
| 5,841,635 A | * | 11/1998 | Sadler et al. | 361/749 |
| 6,292,172 B1 | * | 9/2001 | Makhlouf | 345/157 |

* cited by examiner

*Primary Examiner*—Sumati Lefkowitz
*Assistant Examiner*—Alexander S. Beck

(57) ABSTRACT

A remote control method and system employ remote controller (10) which is adapted for use with an entertainment system of a type including a display (222) as well as providing functions such as Internet access or other functions requiring a keyboard and/or a mouse. The remote controller includes a folding housing and may be operated in a closed or opened configuration. A first set of control inputs (12) are provided on the outer surface of the housing. The housing may be opened, thereby doubling the surface area of the remote controller, to expose a keyboard (56). One or more wireless transmitters are operable with the housing in either of two configurations oriented at 90 degrees to each other and controlled by the first set of control inputs and the keyboard. The remote controller may be conveniently held in one hand of a user when in the folded or closed position and conveniently rested on the lap of the user or a support surface when in the opened position and used as a keyboard.

19 Claims, 8 Drawing Sheets

REMOTE CONTROL METHOD USING REMOTE CONTROL DEVICE WITH KEYBOARD

RELATED APPLICATION INFORMATION

The present application is a continuation-in-part application of Ser. No. 09/065,709 filed Apr. 24, 1998, now U.S. Pat. No. 6,094,156 issued Jul. 25, 2000

BACKGROUND OF THE INVENTION

1. Field of the Invention

The present invention relates to remote control systems for controlling entertainment systems, such as multimedia systems, Internet access systems and browsers, and related methods.

2. Description of the Prior Art and Related Information

Remote control systems are ubiquitous in entertainment systems and multimedia systems of a wide variety, including TVs, game systems, VCRs and many other well-known entertainment devices. At the same time, the need has arisen for providing computer related control capabilities in the living room along with the control of the more conventional entertainment devices typically present in the living room. For example, combined PC and TV systems have been introduced which integrate the capabilities of the personal computer with the television. Also, set top Internet access devices have been introduced which integrate Internet access capabilities with conventional televisions. The ability to provide full control of a PC or an Internet browser typically requires the use of a keyboard as well as a mouse. A conventional remote control is therefore inadequate for control of such combined entertainment systems.

Wireless keyboards have been introduced to meet this need which allow the user of a combined PC and TV system or a user of a TV Internet access device to control such systems more conveniently. Such wireless keyboards may often include an integrated mouse or other pointing device to provide full control of the PC or Internet functions. Also, wireless keyboards specifically designed for combined PC and TV or TV and Internet device control have been designed with function keys which may be used for control of the TV to provide complete control in a single remote device.

Although such wireless keyboard control devices can provide full control capabilities the wireless keyboards are typically similar in size to a conventional keyboard and are thus somewhat cumbersome for use in living room environment. To substantially reduce the size of the keyboard however, would result in the keys being too small for easy use, particularly in a dimly lit environment such as a living room. Also, the multiple functions provided by such a wireless keyboard adapted for control of both a PC or Internet access device and a TV require a larger keyboard layout. This relatively large size of a wireless keyboard also makes balancing the keyboard on the lap of the user somewhat difficult. Also, such wireless keyboards are somewhat obtrusive when not being used, whether when the TV/PC is not being used or when a TV program or video is being viewed. For this reason, a user of such a combined entertainment system incorporating a TV/PC or TV/Internet device will want to also have a hand held remote control to avoid having to use a cumbersome wireless keyboard at all times. This approach is described in U.S. Pat. No. 5,675,390 which describes the use of two remote controls, one a hand-held remote control and the other a wireless keyboard to control a PC/TV entertainment system. This of course does not solve the problem of the obtrusive nature of the wireless keyboard in the living room during the times when it is not being used.

Accordingly, the addition of PC and/or Internet access capabilities to the conventional TV based entertainment system has introduced the problem of controlling such systems with a convenient yet full function remote control system.

SUMMARY OF THE INVENTION

The present invention provides a full function remote control system for an entertainment system which may include a TV and a PC or Internet access device. In addition, the present invention provides such a full function remote control system which is not cumbersome nor intrusive on the living room environment.

The present invention provides a remote control system configured in a folding housing which when in a closed position can be conveniently held in one hand and operated in a similar manner to a conventional TV remote control. That is, common functions such as channel up, channel down, volume up, volume down, power, and a 10 key input may be provided. Transmission of the control signals to the entertainment system may be via a wireless RF or LED transmission as in a conventional remote control. When additional functions are required to control a PC, Internet access device, or other device requiring keyboard input, the housing may be opened and folded into a double width configuration exposing a keyboard and mouse type controller on the inner portion of the housing. In this configuration the remote control system operates as a wireless keyboard and may easily accommodate the necessary keys for such a keyboard. When the keyboard is activated a second LED transmitter or wireless RF transmitter can be used to transmit the keyboard information to the PC or Internet access device. Opening the housing to expose the inner keyboard automatically disables the first wireless transmitter so that resting the remote control on the users lap or a support surface will not inadvertently activate the remote controls on the outer surface of the remote control housing.

To facilitate a compact configuration for the remote control, a double sided circuit board may be employed having the remote control buttons and circuitry for the remote control buttons configured on the outside of the housing on one side of the circuit board and one-half of the keyboard buttons on the inside of the housing on the other side of the circuit board. Also, in one embodiment a multi-directional controller such as a trackball may be provided among the outside controls and also shared with the inside portion of the controls. Alternatively, two different types of multi-directional controllers may be provided, one on the inside of the housing and the other on the outside of the housing. For example, a force sensitive controller may be provided on the outside of the housing and a trackball or glide pad controller provided on the inside of the housing.

Further features and advantages of the present invention will be appreciated by review of the following detailed description of the invention.

DETAILED DESCRIPTION OF THE INVENTION

Figure 1A:
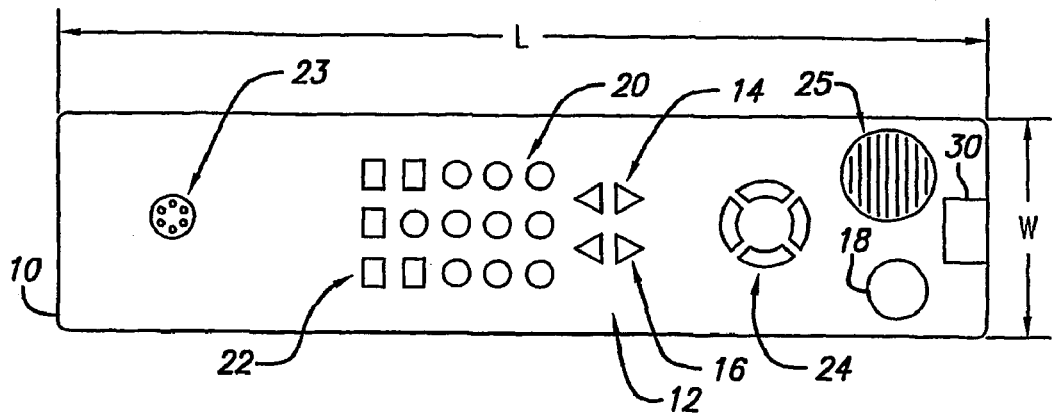
FIGS. 1A, 1B and 1C are top and respective side views of a preferred embodiment of the remote controller of the present invention with the housing in a folded or closed position.
Figure 1B:
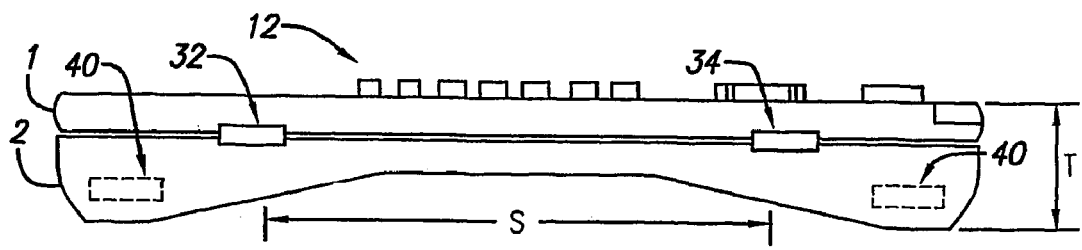
Figure 1C:
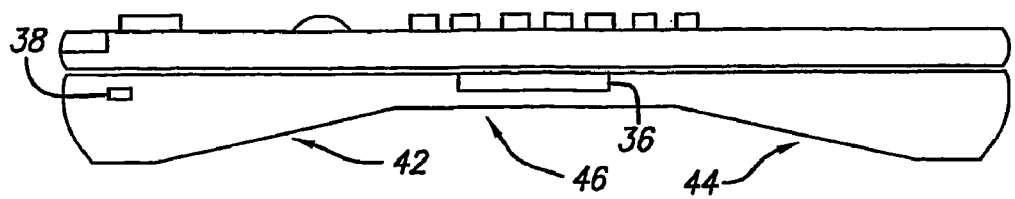

In FIGS. 1A, 1B and 1C the present invention is illustrated in top and respective side views in a presently preferred embodiment. The present invention provides a remote control system adapted for use with an entertainment system requiring keyboard control as well as conventional TV type controls. Such systems are known and will not be described in detail herein. For example, such a system is disclosed in the above noted '390 patent, the disclosure of which is incorporated by reference.

Figure 2A:
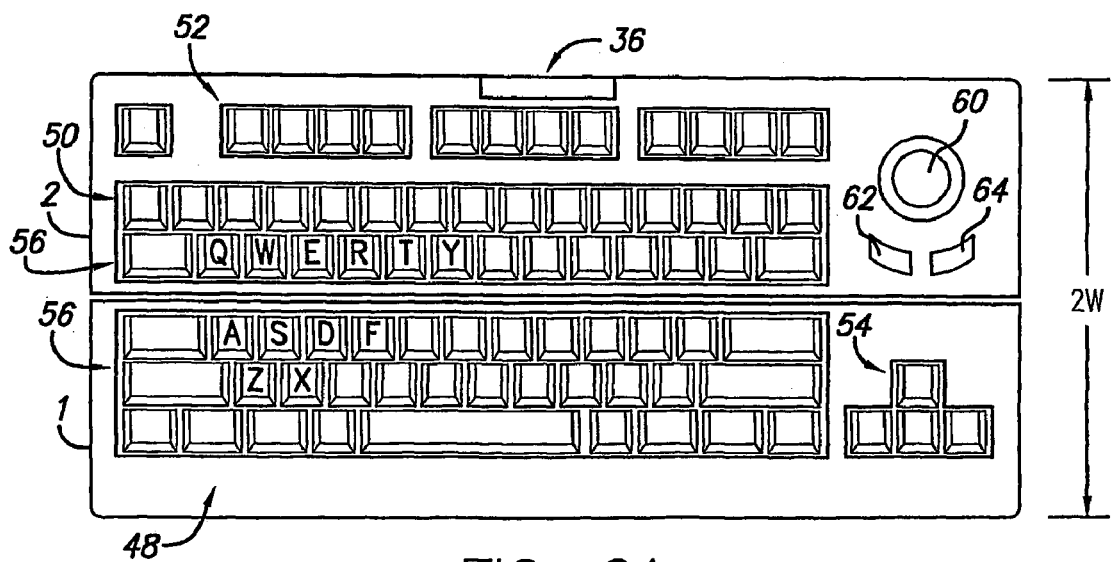
FIGS. 2A and 2B are top in side views respectively of the remote controller of the present invention with the housing in an open configuration.

The remote control system of the present invention is configured in a housing 10 which is adapted to be opened and closed in a folding manner, preferably along one edge of the housing. FIGS. 1A, 1B, and 1C show the housing in a closed configuration whereas FIG. 2A shows the housing in an open configuration. The housing has a generally rectangular configuration viewed from above with a length L and a width W. The length and width are preferably selected so as to allow the remote control to be held comfortably in one hand when the housing is closed. Also, the dimensions are preferably selected to allow the provision of a keyboard when the housing is in the open configuration. Therefore, to provide a convenient size to be hand-held while closed and provide a keyboard when opened, the dimensions of the housing are preferably about 2.5 inches in width and about nine inches in length. This width is approximately that commonly found in conventional remote controls and provides a comfortable width while providing a 5 inch by a nine inch open configuration which easily accommodates the major keys in a full keyboard layout. However, more generally, the width may be from about two inches to about three inches also providing the necessary room for a keyboard in the open configuration while remaining comfortable for being held in one hand. The length in turn may range from about six inches to about 10 inches.

Referring to FIG. 1A, the top surface of the housing 10 includes a number of remote control inputs indicated generally at 12. This first set of control inputs 12 may correspond to conventional remote control functions typically found in hand-held TV remote controls or universal remote controls adapted to control multiple entertainment devices such as TVs, VCRs, CD players, DVD players, etc. Therefore the first set of remote control inputs include the volume up and down set of controls 14, a channel up and down set of controls 16, a power button 18 and a set of numeric inputs 20. Also, a number of programmable or special purpose control buttons may be provided these are indicated generally as buttons 22. Optionally, a microphone 23 is provided which may provide a telephone or videophone functionality or which may be used for voice recognition control of the system. A speaker 25 is also illustrated which may be employed for the above noted telephone or videophone features of the remote controller. Also, a multi-directional controller 24 is preferably provided. The multidirectional controller 24 is illustrated as a top, down, left, right type controller typically found controlling menu type functions, for example, in satellite broadcast television systems. Former, as will be discussed below the multi-directional controller 24 may also be a trackball which may provide mouse type control. As will be discussed below, such house type controllers may require careful consideration in for depth requirements to not impact on the space available on the inside portion of the controller for the keyboard controls. Alternatively, multi-directional controller 24 may be any of variety of other well-known controller types such as a force sensitive controller or for a glide pad controller of the type commonly employed in notebook computers. Depending on the depth garments of such controllers be limitations introduced by the internal set of remote controls may or may not limit the suitability of such controllers. The first set of controls 12 activate a first wireless transmitter 30 which may preferably be an LED or RF transmitter configured at one end of the housing 10.

Figure 2B:
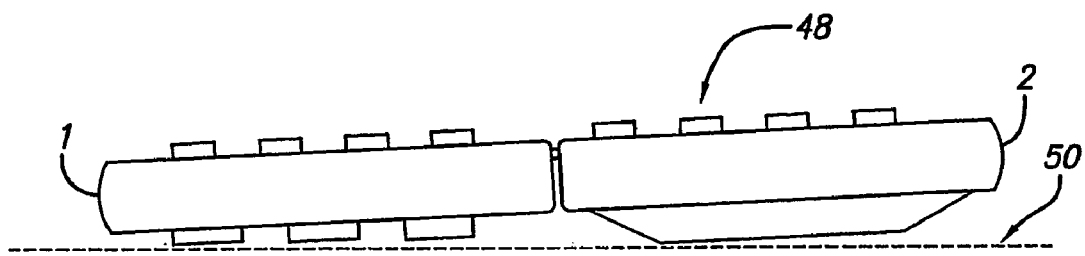

Referring to FIGS. 1B and 1C, first and second side views of the remote control are illustrated. In these respective side views the division of the housing into two sections 1 and 2 which may be opened and closed in a folding manner about hinges 32 and 34 is clearly shown. The first side of the bottom section 2, corresponding to the front of the keyboard when the housing is an opened configuration, includes a second wireless transmitter 36 which also is preferably a wireless RF or LED transmitter. Bottom section 2 also includes a catch release 38 which releases the top section 1 to be opened and also deactivates the first wireless transmitter 30 and activates the second wireless transmitter 36. The bottom section 2 also accommodates batteries indicated by dashed lines 40 which may, for example, be two or more AA type batteries. The shape of the bottom section 2 is illustrated having a varying thickness T with thickened end portions 42,44 and a thinner middle portion 46 having a length S sufficient to accommodate the width of a users hand. For example, S may be about four inches with the overall thickness of the housing 10 in this region being about 1.5 inches or less to allow the comfortable holding of the housing in the closed position in one hand of the user in this region. The configuration of the bottom section 2 illustrated in FIGS. 1B and 1C not only provides additional space in the end portions 42,44 for the batteries, but also provides a curved lower surface which may comfortably sit on one leg of a user or on one arm of a sofa or chair of a type typically found in a living room. This is shown generally in FIG. 2B with the housing shown in an opened configuration positioned on the leg of a user or arm of sofa, shown by general outline 50.

Referring to FIG. 2A, the layout of the keyboard remote controller on the inside surfaces of the first section 1 and second section 2 is shown with the housing in an opened configuration exposing a second set of remote control inputs 48. As shown, the housing in an opened configuration provides a width 2 W which can accommodate the main keys of a full function keyboard in a relatively uncrowded layout. More specifically, the layout includes a conventional QWERTY set of keys 56 split on the two sections 1,2 of the two-piece housing. Also a full set of 10 numeric keys 50 are provided along with 12 function keys 52 and conventional standardized directional keys 54. Also, a multi-directional controller 60 is provided to provide mouse control functions and associated left and right mouse type select buttons 62, 64 are also provided as shown. Multi-directional controller 60 may be a trackball, glide pad, force sensitive controller or other multi-directional controller design known in the art. Each type of multi-directional controller may involve different considerations for the space constraints of the remote controller. A trackball type controller occupies less surface area than a glide pad controller but requires additional depth. Therefore, the different types of controllers may be characterized as three-dimensional in nature, for example, trackball and typical force sensitive controllers, and two-dimensional such as glide pads. The present invention allows three-dimensional multi-directional controllers to be employed by configuring them over the thickened portions 42, or 44, of the bottom section 2 of the remote controller. As discussed below, in hand alternate embodiment two-dimensional controllers may also be accommodated without sacrificing area of the inside surface devoted to the alphanumeric keyboard layout.

Figure 3:
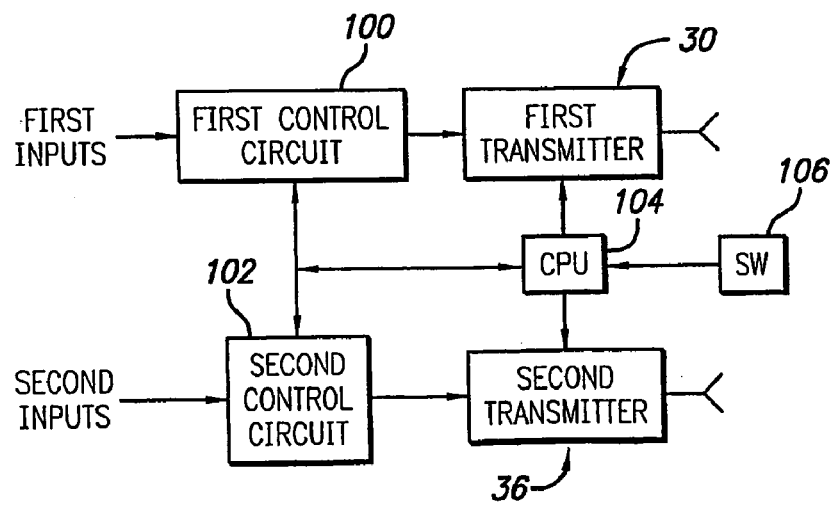
FIG. 3 is a block schematic growing illustrating control circuitry of the remote controller of the present invention.

Referring to FIG. 3, a block schematic diagram is illustrated showing the circuitry of the remote controller and a switch for the selective activation of the first and second transmitters depending upon the closed or opened state of the housing. As shown, the first transmitter 30 is connected to a first set of remote control circuitry 100 and the second transmitter 36 is connected to a second set of remote control circuitry 102 which circuitry is respectively activated by the corresponding outer and inner sets of remote controls. The CPU 104 controls both sets of circuitry and selectively activates one or the other of the first and second transmitters in response to switch 106 which is activated by button 38. As noted above button 38 releases the housing to be opened. Switch 106 is reset when the housing is closed. Alternatively, the switch 106 may be activated automatically by the action of the hinges 32, 34 which incorporate a mechanical switch therein which is activated as the housing is open and closed.

Figure 4:
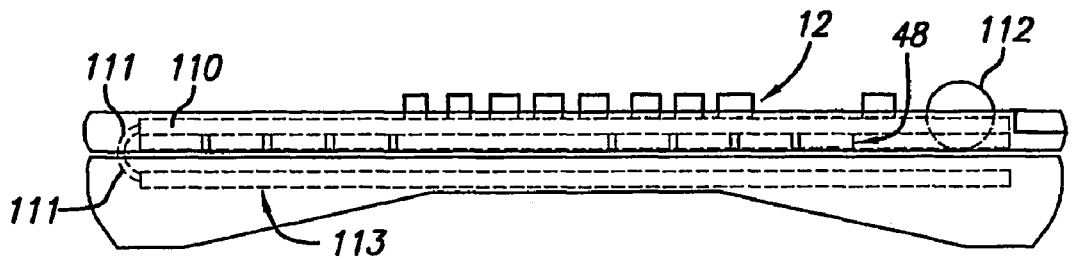
FIG. 4 is a side sectional view of one section of the housing of the remote controller showing a circuit board shared between first and second sets of remote control inputs.

Referring to FIG. 4, a cross section through the first section 1 of the housing is illustrated in an embodiment employing a compact double sided printed circuit board 110. As shown, printed circuit board 110 includes the first set of remote controls 12 mounted on one side of the printed circuit board and the second set of remote controls 48 configured on the other side of the circuit board. Also, FIG. 4 shows an embodiment of the multi-directional controller comprising a shared trackball 112. This shared multi-directional controller allows a relatively large trackball to be employed as part of the first set of remote controls 12. In this embodiment, it will be appreciated that the portion of the circuitry which is shared for shared use of the trackball 112 will not be disabled by the switch 106 shown in FIG. 3. Also, it will be appreciated that other multi-directional controllers may also be shared in whole or in part between the first and second set of controls. For example a glide pad having two active surfaces could advantageously be shared. The printed circuit board 110 also includes an attached flex circuit 111 (partially shown) which is routed through the hinge of the housing and is attached to the printed circuit board 113 in the second section 2 of the housing. The printed circuit board in the second section 2 of the housing may in a preferred embodiment include a microprocessor chip corresponding to CPU 104 which is shared between the first and second remote control circuitry.

Figure 5A:
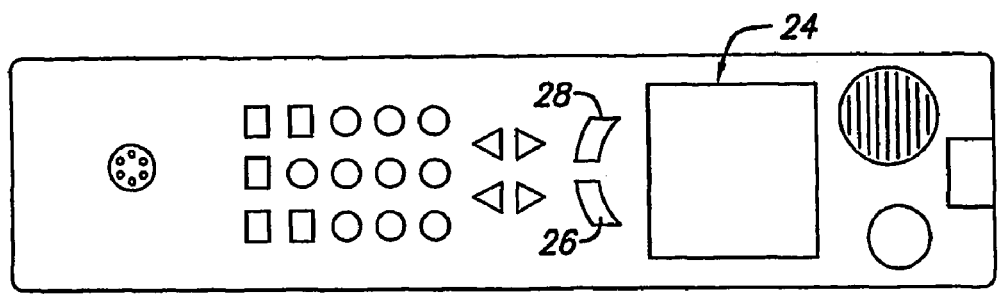
FIGS. 5A and 5B are top views of the remote controller in a closed and opened position, respectively, showing an alternate embodiment employing a glide pad multi-directional controller.
Figure 5B:
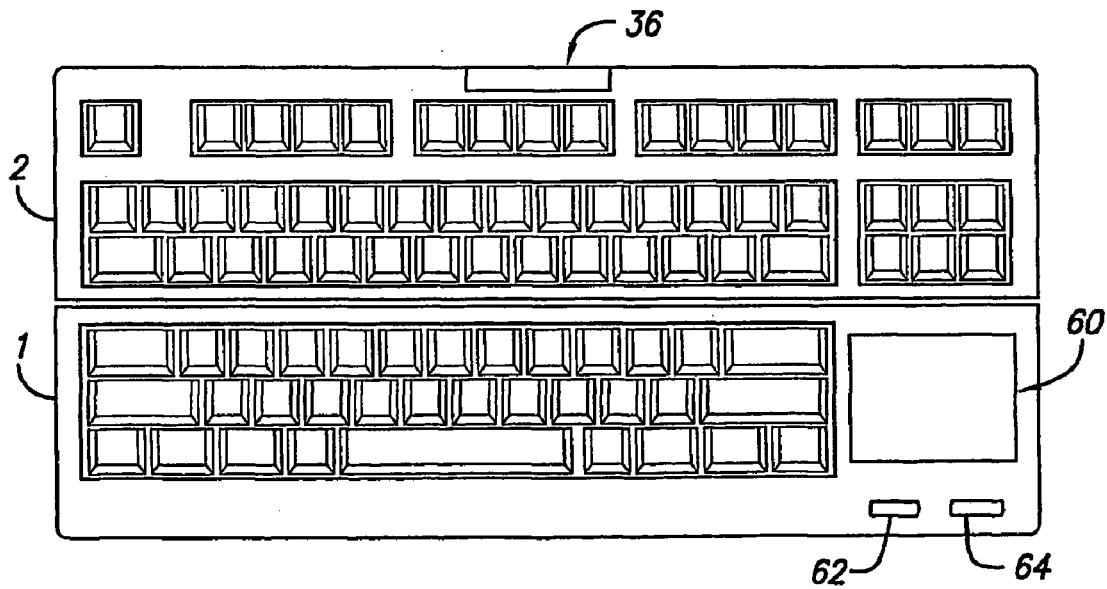

Referring to FIGS. 5A and 5B, an alternate embodiment of the remote controller is illustrated. In the alternate embodiment illustrated in FIG. 5 a glide pad is employed as the multi-directional controller in the first set of remote controls 12 and in the second set of remote controls 48. This allows a portion of the glide pad circuitry to be shared as discussed above but has the disadvantage of using considerable surface area. It will of course be appreciated that a glide pad may be employed for multi-directional controller 24 or 60 in combination with another type of multi-directional controller in the other set of remote controls and the circuitry need not be shared.

Figure 6A:
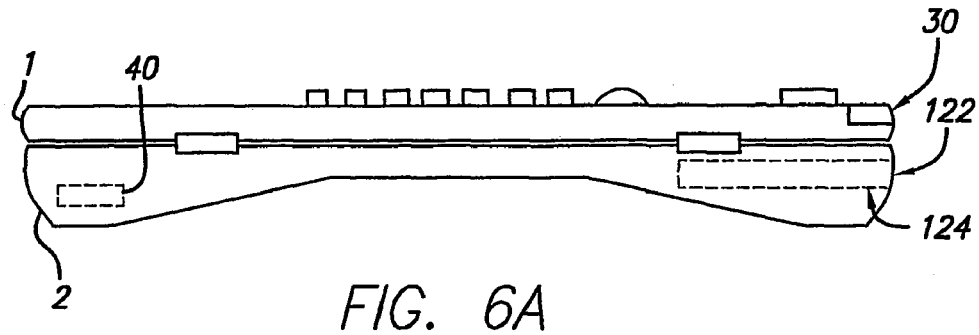
FIGS. 6A, 6B and 6C are two side and a top view respectively of an alternate embodiment of the remote controller employing a sliding multi-directional controller.
Figure 6B:
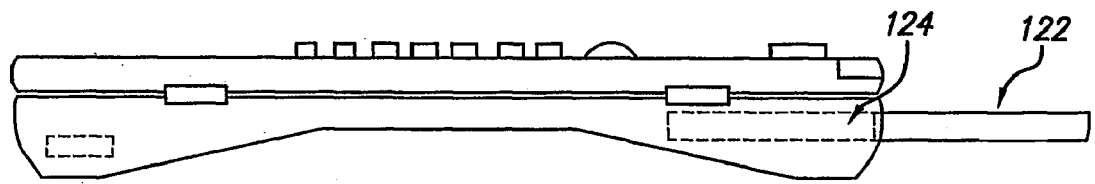
Figure 6C:
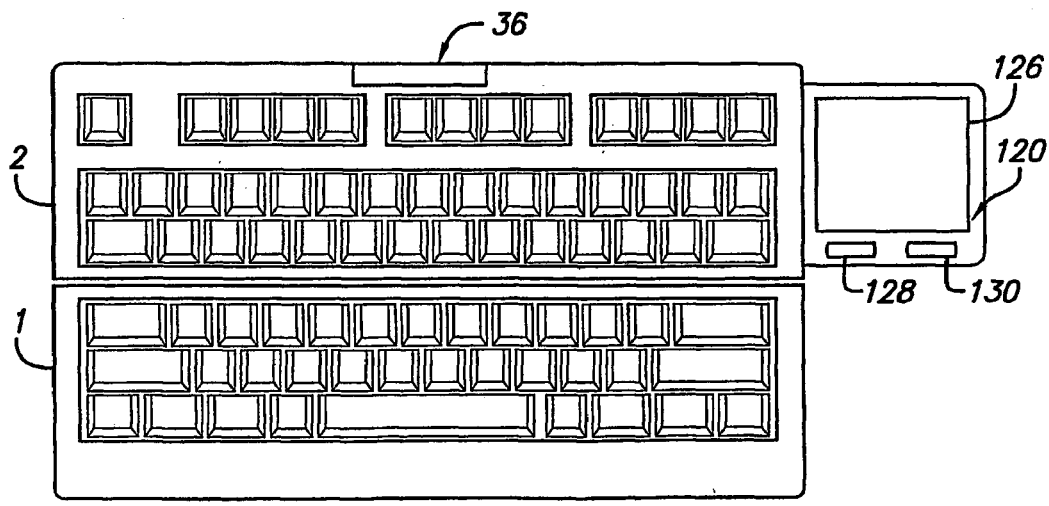

Referring to FIGS. 6A, 6B and 6C an alternate embodiment of the remote controller is illustrated. In the illustrated embodiment, a pullout multi-directional controller 120 is employed. The multi-directional controller 120 is configured on a sliding tray 122 which when not in use is recessed in a matching size recess 124 which is preferably configured in base section 2 of the two-piece housing in one of the enlarged sections 42, 44. The sliding tray 122 is thus positioned in place of one of the battery storage compartments described above in the previously illustrated embodiment. As shown in the top view of the remote controller in the open position in FIG. 6B multi-directional controller 120 may comprise a glide pad 126 and first and second selection buttons 128,130. It will of course be appreciated that other types of controllers may be employed in place of glide pad 126, for example, a force sensitive controller or trackball may also be employed. It will be appreciated that this allows the full-length of the remote controller to be exploited for the keys of the keyboard. In another alternate embodiment, not shown, the multi-directional controller, for example a trackball, may be configured in the side of the thickened portion of the housing 42 adapted to be conveniently operated by one hand of the user when holding the remote controller in the open position and operating as a keyboard.

Figure 7:
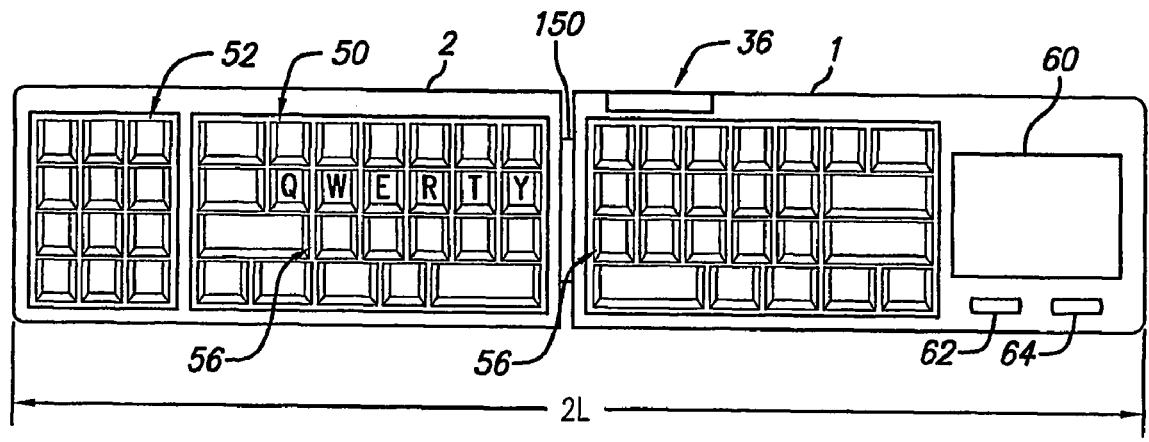
FIG. 7 is the top view of another alternate embodiment of the remote controller of the present invention in an opened configuration.

In yet another alternate embodiment illustrated in FIG. 7, the folding housing may be adapted to fold along the width direction along hinge 150 as opposed to the length direction as in the previously described embodiment. The top set of remote control inputs 12 and first wireless transmitter 30 may be provided in the same general orientation as described previously, and are therefore not shown in FIG. 7, but the second inner set of remote control inputs will now be provided in an expanded configuration over the inner surfaces having a length 2L. The second wireless transmitter 36 is configured on one of the two sections facing perpendicular to the length direction, as shown. Although this layout will not readily correspond to a conventional keyboard layout, since the function keys 52 normally provided on the top of a conventional keyboard are configured on the side as shown whereas the alphanumeric keys are split in a side-by-side manner on the two sections 1,2, it will allow additional freedom for the hands of the user to operate the keyboard in a side-by-side manner and may also sit more comfortably across both legs of the user. Therefore, this alternate folding approach to the housing may be preferred for some situations.

Figure 8:
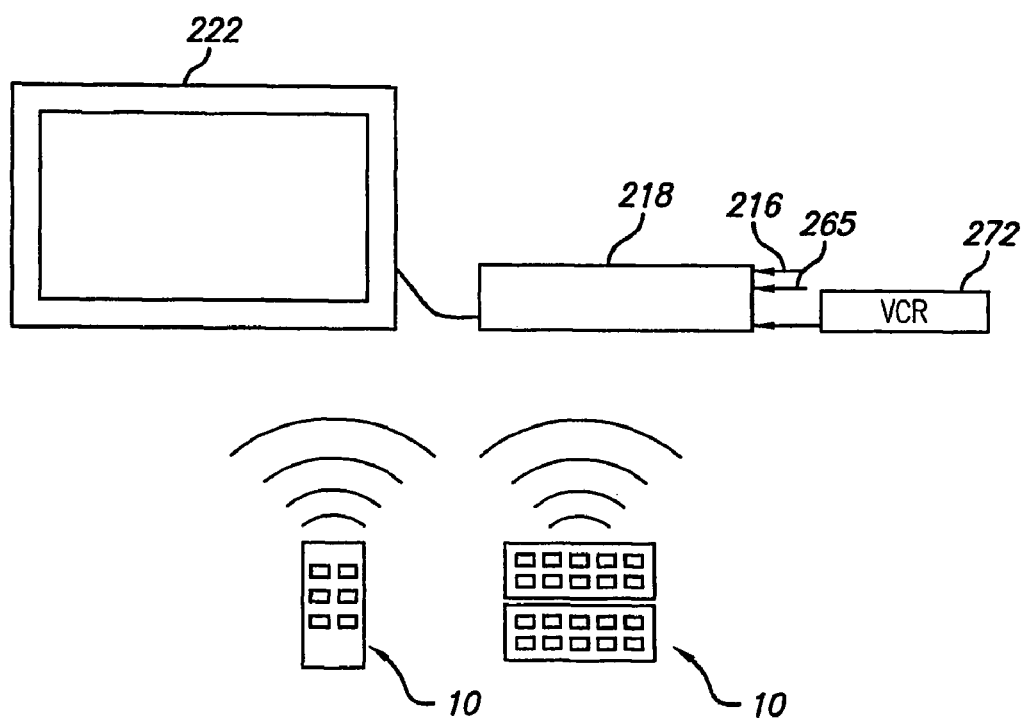
FIG. 8 is a schematic drawing of an improved entertainment system in accordance with the present invention.

Referring to FIG. 8 an improved entertainment system in accordance with the present invention is illustrated. As shown, the entertainment system includes a TV monitor 222 which is coupled to a data processing device 218 of the type which receives text input control signals, such as a PC or internet access device. Also, additional devices or inputs may be provided to the entertainment system, e.g., a VCR 272, and other video and data inputs indicated generally by inputs 216 and 265 in FIG. 8. Also shown is remote 10, illustrated in both the first (open) and second (closed) configurations as described above. Remote 10 provides typical TV type control signals to the entertainment system in the second (closed) position, such as volume up/down and power, and text input control signals in the first (open) position.

Figure 9A:
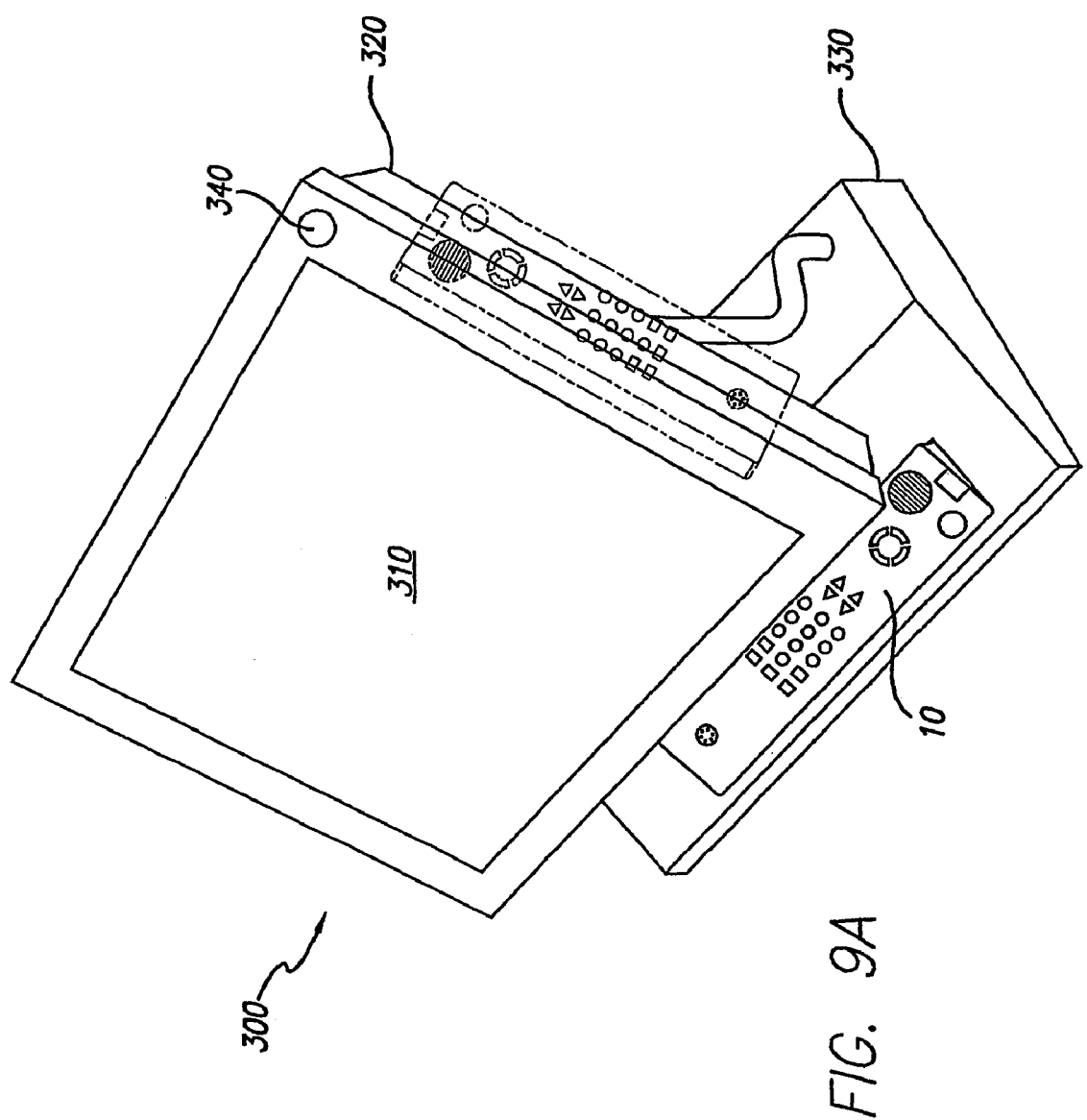
FIGS. 9A and 9B are front perspective views of a compact internet access device in accordance with the present invention.
Figure 9B:
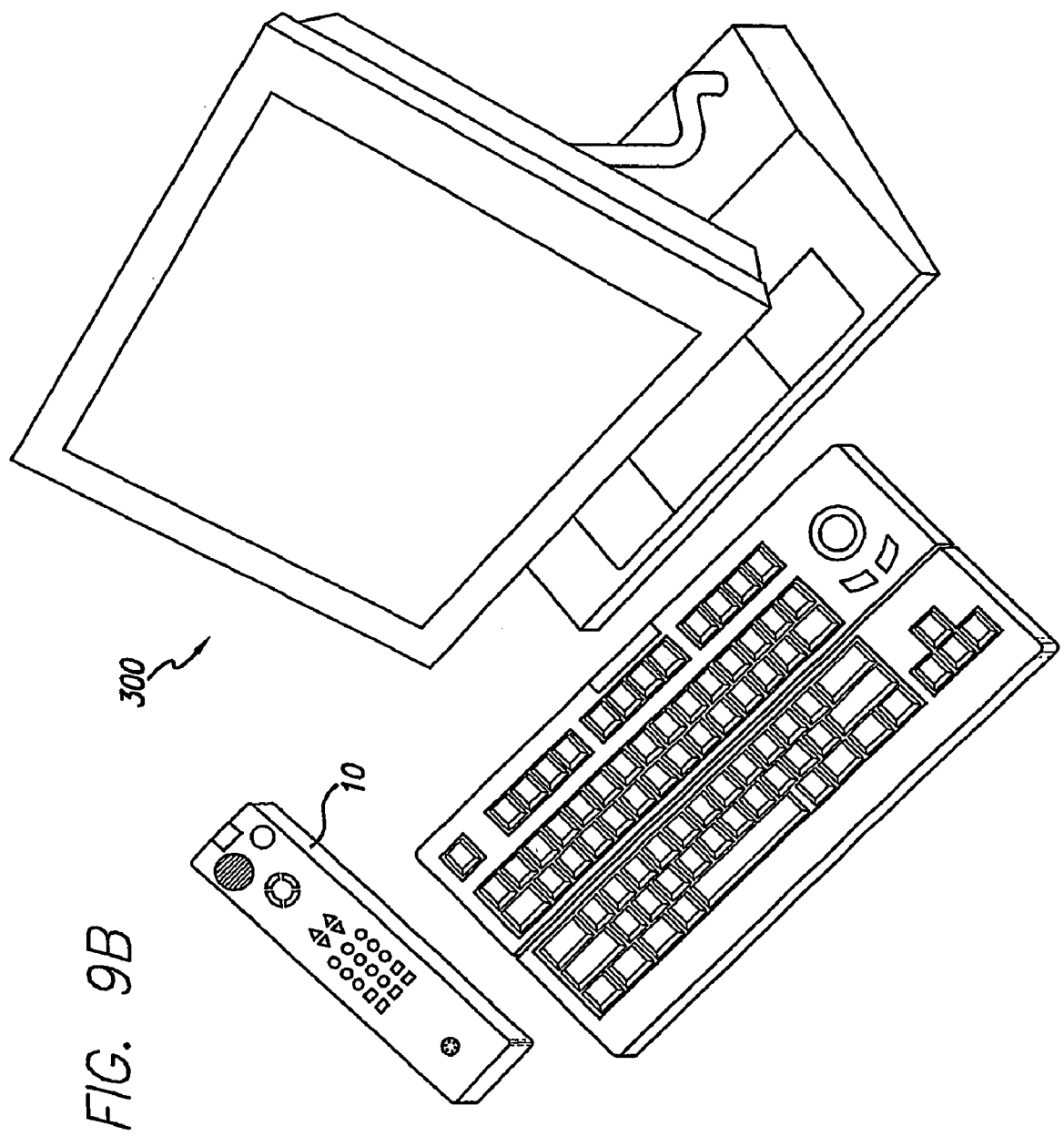

Referring to FIGS. 9A and 9B a compact internet access device 300 is illustrated in accordance with a further aspect of the present invention. For reasons of cost or space, in many applications it is desirable to provide internet access in a relatively compact device. Such devices are sometimes referred to as internet appliances. The folding remote keyboard described previously is ideally suited for such applications due to its compact size and due to the cost savings associated with providing multiple functions in a single package. FIGS. 9A and 9B illustrate the controller 10 described previously incorporated in a system comprising such an internet access device 300.

More specifically, internet access device 300 includes a display 310, which may be an LCD or other known display. A display housing 320 may incorporate the electronics for the device and/or such electronics may be incorporated in base 330. Video telephone capability may be provided and a small video camera 340 may be integrated into the device 300. The electronics for enabling internet access, and other functionality described below are known in the art and are also described in the '390 patent described previously and which functions described therein may also be provided by device 300 in whole or in part. The device 300 may be coupled to the internet through either wired or wireless connection and the suitable modem or other internet connection device may be provided within housing 320 or base 330. A local network connection may also be provided, e.g., to plural devices 300 (not shown but multiple copies of the illustrated device 300 are implied herein for such an embodiment) configured in a home or business, and such local network connection may also be wired or wireless.

FIG. 9A illustrates the remote controller 10 in a recessed cradle in base 330. This may provide a compact storage location for remote 10 and may also allow recharging of the remote from the base 330 if a rechargeable battery is employed for the remote. An alternative cradle location is also illustrated in dashed lines in FIG. 9A on the side of housing 320. Alternatively, the system may be provided without a cradle for remote 10.

In FIG. 9B the system is illustrated with remote 10 in both the open and closed configurations. In the closed configuration convenient control may be provided over a number of commonly used functions of the device 300 using the outer or first control inputs described previously. For example, the multifunction control input and/or buttons described previously may select commonly used functions such as on/off, read e-mail, select website favorites, retrieve audio file, activate videophone or telephone (telephony over IP or analog), play phone messages, etc. Also, an input such as a mouse input or glide pad described previously may be used to control such functions in the closed position as well as other more complicated mouse type control functions available in Internet browsers. In the open configuration in turn full text entry capability is provided and may be used for preparation of e-mails or other tasks requiring text input. Web browsing and mouse control type tasks may also be provided in this configuration. Additional functions described in the above noted '390 patent may also be provided by the remote in its two configurations, which various functions are incorporated herein by reference.

Figure 10A:
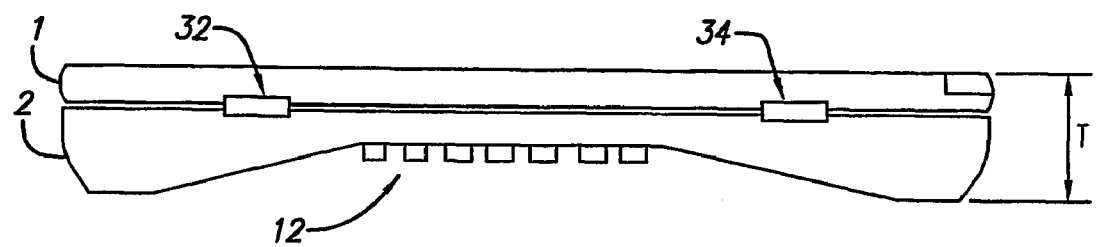
FIGS. 10A and 10B are side and bottom views, respectively, of the folding remote controller in an embodiment adapted for the internet access device of FIGS. 9A and 9B.
Figure 10B:
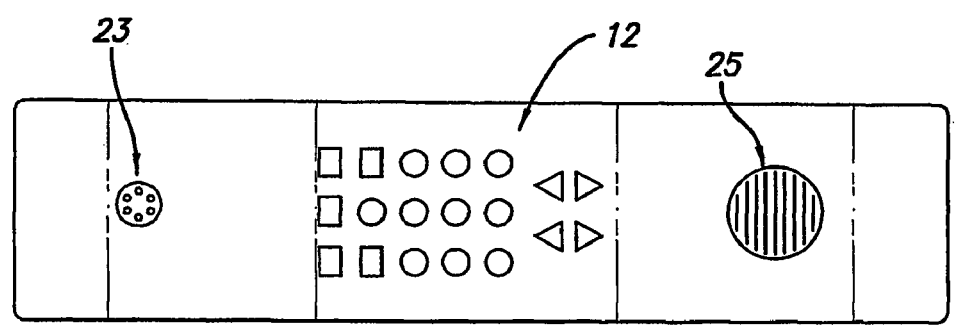

In FIGS. 10A and 10B, an embodiment of the remote 10 is illustrated with inputs 12 on the lower surface of the housing. Such configuration may be desirable where the remote 10 is employed for use with telephone or videophone functions of device 300 and as illustrated microphone 23 and speaker 25 may be configured on the bottom surface as well. Additional outer inputs may be provided on the top surface as well, which are shown in other views and not repeated for convenience of illustration. Preferably such top inputs will be configured away from the thinner central region of the remote which is conveniently grasped by one hand.

It will be appreciated by those skilled in the art that the foregoing is merely an illustration of the present invention in currently preferred implementations. A wide variety modifications to the illustrated embodiments are possible while remaining within the scope of the present convention. Therefore, the above description should not be viewed as limiting but merely exemplary in nature.

The invention claimed is:

1. A remote control adapted for control of a digital device responsive to text input commands and having an associated display, comprising:

at least two sections foldable relative to each other, a first plurality of inputs configured on an outer surface of at least one of the sections and a keyboard including text entry keys comprising separate keys for each letter of the alphabet configured on inner surfaces of both of the sections, the remote control being reconfigurable between a closed configuration wherein the first inputs are exposed and the keyboard is inaccessible and an open configuration wherein the keyboard is exposed and the text entry keys are split across the two sections, wherein at least one of the two sections has a thickness greater than the other section and wherein the text entry keys on that section are oriented so that the thicker section is oriented closer to the digital device and the thinner section farther away during text entry in the open configuration; and at least one short range transmitter providing a first set of control signals to the digital device in response to operation of the first inputs when the remote control device is in the closed configuration and a second set of control signals to the digital device in response to operation of the keyboard when the remote control device is in the open configuration, the second set of control signals including text based commands responsive to activation of keyboard text entry keys on both of said at least two sections.

2. A remote control as set out in claim 1, further comprising a hinge structure coupled to the two sections and configured so as to provide the two sections in a substantially contiguous configuration along respective edge portions with the text entry keys in a closely spaced configuration across the two edge portions.

3. A remote control as set out in claim 1, wherein the text entry keys are configured in a QWERTY keyboard layout split across the two sections.

4. A remote control as set out in claim 1, wherein the adjacent text entry keys are spaced apart across the two sections by a spacing not greater than the width of a single key.

5. A remote control as set out in claim 1, wherein each of the two sections has a width of about 2–3 inches.

6. A remote control as set out in method as set out in claim 1, wherein each of the two sections has a length of about 6–10 inches.

7. A remote control as set out in claim 6, wherein said text entry keys occupy a major portion of the inner surface of each of the two sections.

8. A remote control as set out in claim 1, further comprising a switch for disabling the first inputs when the remote control is changed from a closed to open position.

9. A remote control as set out in claim 1, wherein at least one of the two sections has a thickness which decreases in the middle portion and increases at each end portion.

10. A remote control as set out in claim 9, wherein at least one of the thickened end portions comprises a battery holder.

11. A method for short range remote control of a digital device responsive to text input commands and having an associated display, the method comprising:
providing a remote control device having at least two sections foldable relative to each other, a first plurality of inputs on at least one of the sections and a text entry keyboard comprising separate keys of each letter of the alphabet on both of the sections, the remote control device being reconfigurable between a closed configuration wherein first inputs are exposed and the keyboard is inaccessible and an open configuration wherein the keyboard is exposed and the text entry keys are split across two sections, wherein at least one of the two sections has a thickness greater than the other section and wherein the text entry keys on that section are oriented so that the thicker section is oriented closer to the digital device and the thinner section farther away during text entry in the open configuration;
providing a first set of control signals to the digital device, in response to operation of the first inputs when the remote control device is in the closed configuration; and
providing a second set of control signals to the digital device in response to operation of the keyboard when the remote control device is in the open configuration, the second set of control signals including text based commands responsive to activation of keyboard keys on both of said at least two sections.

12. A method as set out in claim 11, wherein the text entry keys are configured in a QWERTY keyboard layout split across the two sections when the device is in said open configuration.

13. A method as set out in claim 11, wherein the two sections are in a substantially contiguous configuration along respective edge portions with the text entry keys in a closely spaced configuration across the two edge portions when the device is in said open configuration.

14. A method as set out in claim 11, wherein the digital device comprises an internet access device.

15. A method as set out in claim 11, further comprising disabling the first inputs when the remote control device is changed from a closed to open position.

16. A method as set out in claim 11, wherein the acts of providing the first and second control signals comprises at least one of RF wireless transmission and infrared wireless transmission.

17. An information display system, comprising:
a display;
an information processing device associated with the display and employing the display as an information display device, the device responsive to remote control signals including text input commands; and
a remote control, having a housing with at least two sections connected together so as to be reconfigurable between an open configuration and closed configuration, the remote control further having one or more first inputs on the outside surface of the housing for inputting first commands to the information processing device and a keyboard comprising a plurality of text entry keys comprising separate keys for all the letters of the alphabet configured on inner surfaces of said at least two sections and split across the two sections, wherein at least one of the two sections has a thickness greater than the other section and wherein the text entry keys on that section are oriented so that the thicker section is oriented closer to the digital device and the thinner section farther away during text entry in the open configuration.

18. An information display system as set out in claim 17, wherein the information processing device provides internet access.

19. An information display system as set out in claim 17, wherein the text entry keys are configured in a QWERTY keyboard layout split across the two sections.

* * * * *